United States Patent Office 3,377,327
Patented Apr. 9, 1968

3,377,327
LUBRICATION OF CHLOROBUTYL RUBBER
USING TRICHLOROSILANE
Richard L. Gabriel, Gonic, N.H., assignor to General
Electric Company, a corporation of New York
No Drawing. Filed Jan. 24, 1964, Ser. No. 339,893
1 Claim. (Cl. 260—85.3)

ABSTRACT OF THE DISCLOSURE

A method of lubricating chlorobutyl rubber by treating the chlorobutyl rubber with a liquid silicone material having a major portion of unhydrolyzed chlorosilanes for at least 15 seconds, then washing with water to hydrolyze any chlorosilanes not reacted and then drying for at least 15 minutes at 150° C.

---

This invention relates to chlorobutyl rubber and more particularly to a method of lubricating chlorobutyl rubber and to chlorobutyl rubber lubricated by such method.

Chlorobutyl rubber is a synthetic rubber material prepared by copolymerization of isobutane with a small portion of isoprene or butadiene. To this material is added a chlorine which replaces some of the hydrogen, thereby providing a butyl rubber containing reactive chlorine. Chlorobutyl rubber has many characteristics which are similar to natural rubber and, in addition, is extremely resistant to chemical attack and aging. Because of these characteristics of the chlorobutyl rubber, it finds wide usage in industry. One well known use for chlorobutyl rubber is as a gasket material. However, one characteristic of chlorobutyl rubber which militates against its use is its tackiness or high coefficient of friction after it has been cured. As will be apparent, this makes chlorobutyl rubber difficult to use as gaskets, packing or wipers where a member is required to move over the chlorobutyl rubber or the chlorobutyl rubber moves over a member.

This difficulty has long been recognized and many attempts have been made to decrease the coefficient of friction; that is, to increase the surface lubricity of the chlorobutyl rubber. However, one of the major problems has been to devise a means of increasing the surface lubricity without changing any of the desirable characteristics of the chlorobutyl rubber.

It has recently been discovered that excellent surface lubricity can be obtained by contacting the chlorobutyl rubber with a silicone material. The silicone material apparently reacts with the chlorobutyl rubber or penetrates its surface to impart a substantial lubricity to the surface without changing the desirable characteristics of the chlorobutyl rubber.

It is, therefore, one object of this invention to provide a novel method of treating chlorobutyl rubber to improve its surface lubricity.

A further object of this invention is to provide a novel method of treating chlorobutyl rubber with a silicone material.

A still further object of this invention is to provide an improved chlorobutyl rubber having excellent surface lubricity.

Briefly, in one form this invention discloses a method of treating chlorobutyl rubber with a silicone material by contacting the chlorobutyl with the silicone material for a short period. The silicone material combines with the chlorobutyl rubber to provide a surface having excellent lubricity. The invention also relates to a chlorobutyl rubber in which the surface of the rubber is combined with a silicone material.

The invention which is desired to be protected will be particularly pointed out and distinctly claimed in the claims appended hereto. However, it is believed that the invention and the manner in which its various objects and advantages are obtained, as well as other objects and advantages thereof, will be more fully understood from the following detailed description and the various specific examples set forth hereinafter.

As above noted, it has been discovered that if the surface of chlorobutyl rubber is contacted with a silicone material the silicone material will combine with the surface of the chlorobutyl rubber to provide excellent surface lubricity to the chlorobutyl rubber. In some instances, it is believed that the silicone material reacts directly on the chlorobutyl rubber or with the water which is tightly held on its surface. In other instances it is thought that the silicone material penetrates the surface of the chlorobutyl rubber, leaving a thin film of a silicone material on the surface of the chlorobutyl rubber which is tightly held due to its penetration into the surface of the chlorobutyl rubber.

One method of carrying out this invention is by forming a solution of a silicone fluid, the silicone fluid having a viscosity of approximately 500 centistokes. The solution may be prepared using any type of carrier which will act to swell the chlorobutyl rubber. One well known carrier which has provided excellent results is trichloroethylene. In general, the solution comprises approximately .5 to 5% of the silicone fluid in the carrier, the percentage being based on the weight of the carrier. The solution is maintained at room temperature and the chlorobutyl rubber to be treated is dipped into the solution, remaining in the solution for from 15 seconds to 2 minutes, or even longer. The preferred time is approximately 30 seconds. The carrier material swells the chlorobutyl rubber, allowing it to take up the silicone material. After the chlorobutyl rubber is removed from the solution it is dried at approximately 150° C. to remove the carrier. It has been found that the drying period should be at least 15 minutes.

As a specific example, a solution was prepared using trichloroethylene and a silicone oil which is marketed by the General Electric Company under the term "SF-96." This oil has a viscosity of approximately 500 centistokes. The silicone oil was present in the solution at 2% based on the weight of the trichloroethylene. Gaskets formed of chlorobutyl rubber were dipped in this solution and fully immersed therein for approximately 30 seconds. When the gaskets were removed they were dried in an oven for 15 minutes at approximately 150° C. Before dipping, the gaskets were very tacky and tended to stick to the surface to which they were applied. However, after treatment the gaskets had a very slippery feel and when applied between surfaces readily allowed a member to slip over the surface of the gasket. While not completely understood, it is believed that the silicone oil slightly penetrated the surface of the swelled chlorobutyl rubber and provided a very thin film of silcone oil to the surface.

Other solutions which have been prepared and which provide equivalent results on chlorobutyl rubber are as follows: A solution using the same carrier and the same silicone oil, with the oil being present in the quantity of 0.5% based on the weight of the trichloroethylene. Chlorobutyl rubber gaskets were fully immersed in the solution for approximately 2.5 minutes and then oven dried as before. The resulting gaskets appeared the same as those treated by the earlier solution. Similar solutions using larger percentages of silicone oil, have been used with equally good results. Less than approximately 0.5% silicone oil in carrier solution does not provide sufficient lubricity to the chlorobutyl rubber. When quantities of silicone oil greater than approximately 5% are used no improved results are obtained, and it is still necessary to immerse the chlorobutyl rubber in the solution for at least 15 seconds. Many types of carriers have been found useful, for example, toluene, xylene, trichlorotrifluoroethane and dichloromethane. The desired carrier must be one which will penetrate or swell the chlorobutyl rubber without causing any unfavorable or undesirable reaction with the chlorobutyl rubber.

Another method which has been found equally effective in increasing the surface lubricity of chlorobutyl rubber uses a silicone material in liquid form in which the major portion of the silicone is in the form of unhydrolyzed chlorosilanes. One type of silicone material is known by the term "trichlorosilane." The trichlorosilane is placed in a covered chamber at room temperature and the chlorobutyl rubber to be treated is hung in the chamber above the liquid material. The trichlorosilane tends to evaporate in the closed chamber thereby filling the upper portion of the chamber with a vapor of trichlorosilane. The chlorobutyl rubber is exposed to this vapor for at least 30 seconds, after which it may be removed. The chlorobutyl rubber is then water washed to hydrolyze any of the chlorosilanes which have not previously reacted. The water washed chlorobutyl rubber may then be dried for approximately 15 minutes at 150° C. If desired, the gaskets may be dipped in the trichlorosilane liquid. However, due to the toxicity of this liquid it is preferred to treat the chlorobutyl rubber with the vapor only. It is believed that the chlorosilanes react directly with the chlorobutyl rubber or with the water which is normally tightly held to the surface of the chlorobutyl rubber. Whichever is the case, the trichlorosilane treatment provides an excellent surface lubricity to the chlorobutyl rubber.

As a specific example of this method, a silicone material containing a major quantity of unhydrolyzed chlorosilanes, sold by the General Electric Company under the designation "SC–87," was placed in a closed chamber. The chamber was maintained at room temperature and a plurality of gaskets made of chlorobutyl rubber were hung in the chamber above the surface of the liquid therein. The gasket material was left in the chamber for a period of approximately 30 seconds and was then removed. After removing, the gaskets were water washed to hydrolyze any of the chlorosilane which had not reacted with the surface of the chlorobutyl rubber gaskets. The gaskets were then dried in an oven for approximately 15 minutes at a temperature of approximately 150° C. As in the earlier example, before treating, the chlorobutyl rubber gaskets were very tacky to feel and tended to stick to the surface of any member on which they were placed. However, after treating, the gaskets were very slippery to the feel and would readily allow any member to slide thereover.

From the above examples hereinbefore set forth it is apparent that by means of the disclosed methods excellent surface lubricity may be provided to chlorobutyl rubber. Further, it will be apparent that by means of the disclosed methods that a chlorobutyl rubber material is provided in which a silicone material has combined with the surface thereof to impart excellent surface lubricity.

While there has been described various specific embodiments of the invention it will be understood that various changes may be made without departing from the spirit and scope of the invention, especially as set forth in the following claim.

What is claimed as new and which it is desired to secure by Letters Patent of the United States is:

1. A method of imparting excellent surface lubricity to chlorobutyl rubber which comprises the steps of placing trichlorosilane containing a major portion of unhydrolyzed chlorosilanes in a closed chamber, maintaining said chamber at room temperature, placing in said chamber, above the surface of said liquid, chlorobutyl rubber to be treated, leaving said chlorobutyl rubber in said closed chamber for at least 30 seconds, removing said chlorobutyl rubber material and water washing said material to hydrolyze any unreacted chlorosilanes.

References Cited

UNITED STATES PATENTS 2,720,495  10/1955  Phreaner _____ 260—29.1
3,231,496  1/1966  Pater _____ 252—34.7

OTHER REFERENCES

Barron, H.: Modern Rubber Chemistry, D. Van Nostrand Co., Inc., 1957 (p. 89 relied on).

JOSEPH L. SCHOFER, *Primary Examiner.*

R. A. GAITHER, *Assistant Examiner.*